United States Patent [19]
Tam

[11] Patent Number: 5,390,226
[45] Date of Patent: Feb. 14, 1995

[54] METHOD AND APPARATUS FOR PRE-PROCESSING CONE BEAM PROJECTION DATA FOR EXACT THREE DIMENSIONAL COMPUTER TOMOGRAPHIC IMAGE RECONSTRUCTION OF A PORTION OF AN OBJECT

[75] Inventor: Kwok C. Tam, Schenectady, N.Y.

[73] Assignee: General Electric Company, Schenectady, N.Y.

[21] Appl. No.: 908,114

[22] Filed: Jul. 2, 1992

[51] Int. Cl.$^6$ .................................. G01N 23/083
[52] U.S. Cl. .................................. 378/19; 378/8; 378/901; 364/413.15; 364/413.16
[58] Field of Search ............... 378/4, 8, 14, 19, 901; 364/413.14, 413.15, 413.16, 413.19

[56] References Cited

U.S. PATENT DOCUMENTS

| | | | |
|---|---|---|---|
| 4,709,333 | 11/1987 | Crawford | 364/414 |
| 5,073,910 | 12/1991 | Eberhard et al. | 378/4 |
| 5,187,659 | 2/1993 | Eberhard et al. | 364/413.15 |
| 5,257,183 | 10/1993 | Tam | 364/413.19 |
| 5,333,164 | 7/1994 | Tam | 378/8 |

OTHER PUBLICATIONS

U.S. Patent Application Serial No. 07/725,142, filed Jul. 3, 1991, Kwok C. Tam, "Method and Apparatus for Acquiring Complete Radon Data for Exactly Reconstructing a Three Dimensional Computerized Tomography Image of a Portion of an Object Irradiated by a Cone Beam Source".

Primary Examiner—Paul M. Dzierzynski
Assistant Examiner—David V. Bruce
Attorney, Agent, or Firm—Paul R. Webb, II

[57] ABSTRACT

An improved method and apparatus for preprocessing cone beam attenuation data to reconstruct a three dimensional image of a particular region of interest of an object by a process of inverse Radon transformation is described. The number of required operations is substantially reduced by selectively retaining for further processing only that cone beam attenuation data acquired within a select closed region of the surface of the array detector wherein this region provides data corresponding to beams actually attenuated in passing through the region of interest of the object. In this manner, unnecessary beam attenuation data is discarded at the earliest possible opportunity to expedite image processing.

8 Claims, 4 Drawing Sheets

METHOD AND APPARATUS FOR PRE-PROCESSING CONE BEAM PROJECTION DATA FOR EXACT THREE DIMENSIONAL COMPUTER TOMOGRAPHIC IMAGE RECONSTRUCTION OF A PORTION OF AN OBJECT

CROSS REFERENCE TO RELATED APPLICATIONS

This application is related to commonly assigned U.S. patent application Ser. No. 07/725,142 by Kwok C. Tam entitled "METHOD AND APPARATUS FOR ACQUIRING COMPLETE RADON DATA FOR EXACTLY RECONSTRUCTING A THREE DIMENSIONAL COMPUTERIZED TOMOGRAPHY IMAGE OF A PORTION OF AN OBJECT IRRADIATED BY A CONE BEAM SOURCE", the entire disclosure of which is hereby incorporated herein by reference.

FIELD OF THE INVENTION

This invention relates generally to method and apparatus for acquiring a sufficient and complete data set for exact three dimensional computerized tomographic (3DCT) image reconstruction of a portion or specific region of interest of an object irradiated by a cone beam source. The invention relates more particularly to method and apparatus for preprocessing cone beam attenuation data by retaining only data acquired within a select region identified on the surface of a suitable surface array detector for further processing; thus, substantially reducing the number of operations performed in reconstructing an exact 3D image by a Radon inversion transformation.

BACKGROUND OF THE INVENTION

Commonly assigned U.S. patent application Ser. No. 07/725,142 by Kwok C. Tam discloses method and means for accomplishing region of interest imaging Of a portion of an object irradiated in a field of view of a cone beam source. The region of interest may be a select portion of an object wherein the object is wholly engulfed within the field of view of a cone beam source. Alternatively, the region of interest may be only that portion of an object which fits within a field of view of a cone beam source when the entire object is too large to be wholly irradiated thereby. In either case, this region of interest is rotationally scanned by a cone beam irradiating source at its upper and lower extent along two scanning paths which serve to bound the region of interest. To ensure that a complete Radon data set is acquired for exact image reconstruction, the upper and lower scan paths are connected by a scan path therebetween in order to provide a complete scanning trajectory. Cone beam attenuation data are acquired by a suitable surface array radiation detector wherein the source and array detector are mutually fixed with respect to one another so as to rotatably scan the region of interest in order to acquire cone beam attenuation data at the detector surface for a plurality of source positions along the scanning trajectory.

To ensure exact image reconstruction, cone beam attenuation data must be acquired in a manner which fills Radon space over a so called 'region of support' in Radon space corresponding to the field of view occupied by the region of interest of the object in real space. Such filling provides sufficient Radon data to completely and exactly reconstruct a 3DCT image by a process of inverse Radon transformation. In so doing, at least a requisite core number of necessary data points in Radon space is selectively retained, these data points contribute to imaging the region of interest in Radon space. A 3DCT cone beam reconstructed image obtained by inverse Radon transformation utilizes a mathematical point by point inversion technique. The Radon inversion technique is inherently a computationally intensive process which becomes unduly burdened by tracking those Radon data points which either do not contribute or redundantly contribute to reconstruction of a 3D image of the region of interest. Typically, either all collected data throughout Radon space is indiscriminantly retained for point by point inversion processing, or a truncated subset of Radon data representing only source beams which actually pass through the object are selectively retained for point by point inversion processing. Truncation boundaries in Radon space are typically identified by the use of projection and/or intersection operations which are easier to apply than direct point by point mathematical manipulations.

In a typical 3DCT reconstruction by Radon inversion, planar integrals corresponding to beam attenuation detector line integrals are calculated and organized as discrete data points in Radon space. Radon data points are organized onto an arbitrary set of planes in Radon space, wherein each surface of integration is used to calculate a Radon derivative corresponding to a single data point in Radon space. These discretely organized Radon data points are typically partitioned and selectively retained or discarded according to whether or not corresponding surfaces of integration intersect the region of interest of the object. By its mathematical nature, Radon space is a collection of discrete Radon data points each corresponding to a surface of integration, e.g. a planar integral. For each integration plane that intersects the region of interest, the corresponding computation of a Radon derivative, i.e. a Radon data point, depends upon the manner in which that plane intersects with the region of interest. Thus, the adequacy of filling the region of support in Radon space is generally assessed by first partitioning those integration planes which contribute to data points in Radon space as follows:

1. An integration plane that does not intersect the region of interest;
2. An integration plane that intersects the region of interest only;
3. An integration plane that intersects the region of interest and also either the region above or the region below, but not both;
4. An integration plane that intersects the region of interest and also both the region above and the region below.

For case 1, the planar integral will always be zero, thus no Radon derivative need be computed;

For case 2, the Radon derivative is computed in a standard manner requiring no further consideration as the Radon data are not corrupted by any contributions other than those due to the region of interest itself.

For case 3, the planar integral is computed from cone beam data according to copending patent application Ser. No. 07/725,142 wherein cone beam data originating outside the region of interest are set to zero before computation of the Radon derivative. This eliminates any additive contributions that would otherwise corrupt the data set.

Case 4 is the most general situation to be addressed as it encompasses cases 2 and 3. For case 4, such zeroing does not suffice, as corrupting contributions do not simply additively contribute but collectively cooperate with contributions from other source positions to provide unwanted corruption of the resulting Radon data set. In such case, the Radon derivative is obtained by adding the results computed from cone beam data derived from more than one source position.

The procedure is illustrated in FIG. 1 showing a typical integration plane 1 of the case 4 category. Plane 1, herein the plane of the figure, intersects source position 2 identified by an "A" on an upper scan path at level 3 and source position 4 identified by a "B" on lower scan path at level 5. That portion of plane 1 intersecting region of interest 14 of object 22 is divided into two partial planes by line 6 which connects points A and B to provide a common boundary therebetween. The Radon derivative for the upper portion, indicated by partial plane 8, is computed from cone beam rays emitted at source position A within an angular range defined between an upper boundary at level 3 and line 6. Similarly, the Radon derivative for the lower portion, indicated by partial plane 12, is computed from cone beam rays emitted at source position B within an angular range defined between the lower boundary at level 5 and line 6. Thus, unwanted contributions due to those portions of object 22 outside region of interest 14, i.e. beyond an upper scan path at level 3 and a lower scan path at level 5, which corrupt computation of planar integrals, and thereby Radon derivatives, can be eliminated by discarding all cone beam data whose paths traverse the region beyond that bounded by upper scan path at level 3 and lower scan path at level 5. Those source beams that penetrate some remainder of the object as well as region of interest 14, provide cone beam data that is not attributable solely to the region of interest i.e. the Radon data set is corrupted. Manipulation of Radon data by first partitioning integration planes into the cases previously discussed has typically been a necessary prerequisite for eliminating these unwanted corrupting contributions. Such processing has been required to ensure that an uncorrupted yet sufficiently complete Radon data set is acquired for reconstructing of an exact 3D image of the region of interest.

Typically, truncation of unnecessary data has taken place only in Radon space, in order to assure the availability of sufficient Radon data points for processing an exact image of the region of interest. Performing truncation at this stage in the processing of a reconstructed image by Radon inversion needlessly wastes time, computer resources, and money. It is therefore desirable to reduce the requisite number of computational operations at the earliest possible opportunity in order to expedite image processing without requiring any of the prior categorization and manipulation of integration planes.

OBJECTS OF THE INVENTION

It is an object of the invention to perform 3DCT image reconstruction of a region of interest of an object irradiated by a cone beam source by Radon inversion in a more efficient and expedient manner.

It is another object of the invention to simplify requisite data processing through preprocessing of cone beam attenuation data by selectively retaining data acquired at the surface of a suitable radiation detector array, wherein only that data necessary for exact image reconstruction is retained.

It is yet another object of the invention to eliminate the need to keep track of the exact number of source positions that contribute to a particular Radon data point.

SUMMARY

The invention is directed to method and apparatus for pre-processing cone beam attenuation data for reconstructing a 3D image of a region of interest of 3D object using an inverse Radon transformation process which includes: providing a mutually spaced irradiating cone beam source and a suitable array radiation detector to rotationally scan with respect to a region of interest of the object in order to irradiate the region of interest within a field of view of the cone beam source. The region of interest is rotationally scanned along its upper and lower extent using respective upper and lower scan paths which are joined by a connecting scan path to provide a complete scanning trajectory. A select region on the detector surface is identified as a cone beam projection of the object bounded between similar projections of upper and lower scan paths. Cone beam attenuation data is acquired at the surface of the detector for various scanning positions along the scanning trajectory. Only, cone beam attenuation data acquired within this select region is retained for further processing. Thus, by proper identification of this select region, only data corresponding to cone beams attenuated in passing through the region of interest itself are retained for further processing in order to reconstruct an exact 3D image of the region of interest by a typical inverse Radon transformation technique.

BRIEF DESCRIPTION OF THE DRAWINGS

While the novel features of the invention are set forth with particularity in the appended claims, the invention, both as to organization and content will be better understood and appreciated, along with other objects and features thereof, from the following detailed description taken in conjunction with the drawings in which:

DETAILED DESCRIPTION OF THE INVENTION

Typical region of interest image reconstruction requires 1) identification of each integration plane type, as discussed in the background section above; 2) a determination of the angular range of the cone beam data for each contributing source position required to compute the Radon derivative for each integration plane of the case 4 type; and 3) keeping track of the exact number of source positions that contribute to a particular Radon data point. The invention described herein improves the general approach of U.S. patent application Ser. No. 07/725,142 by eliminating such otherwise requisite procedures by pre-processing cone beam attenuation data for image reconstruction in a manner whereby only detector data acquired within a select region identified on the surface of the detector array is retained for further processing. Thus, image processing requires fewer operations resulting in a savings of time, money and computer resources.

Figure 1:
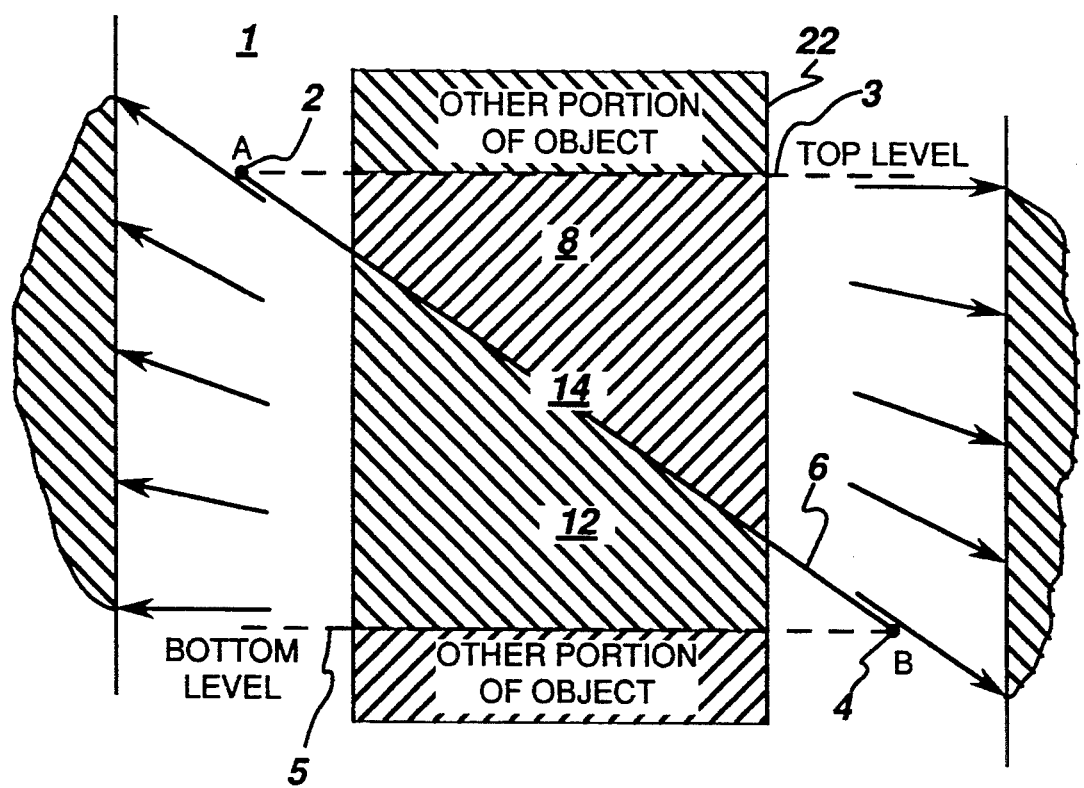
FIG. 1 illustrates a typical approach to calculating a Radon derivative showing partial integration plane contributions corresponding to respective upper and lower source positions for a plane of the case 4 type, in accordance with U.S. patent application Ser. No. 07/725,142.

FIG. 1 has been previously discussed in the background section.

Figure 2A:
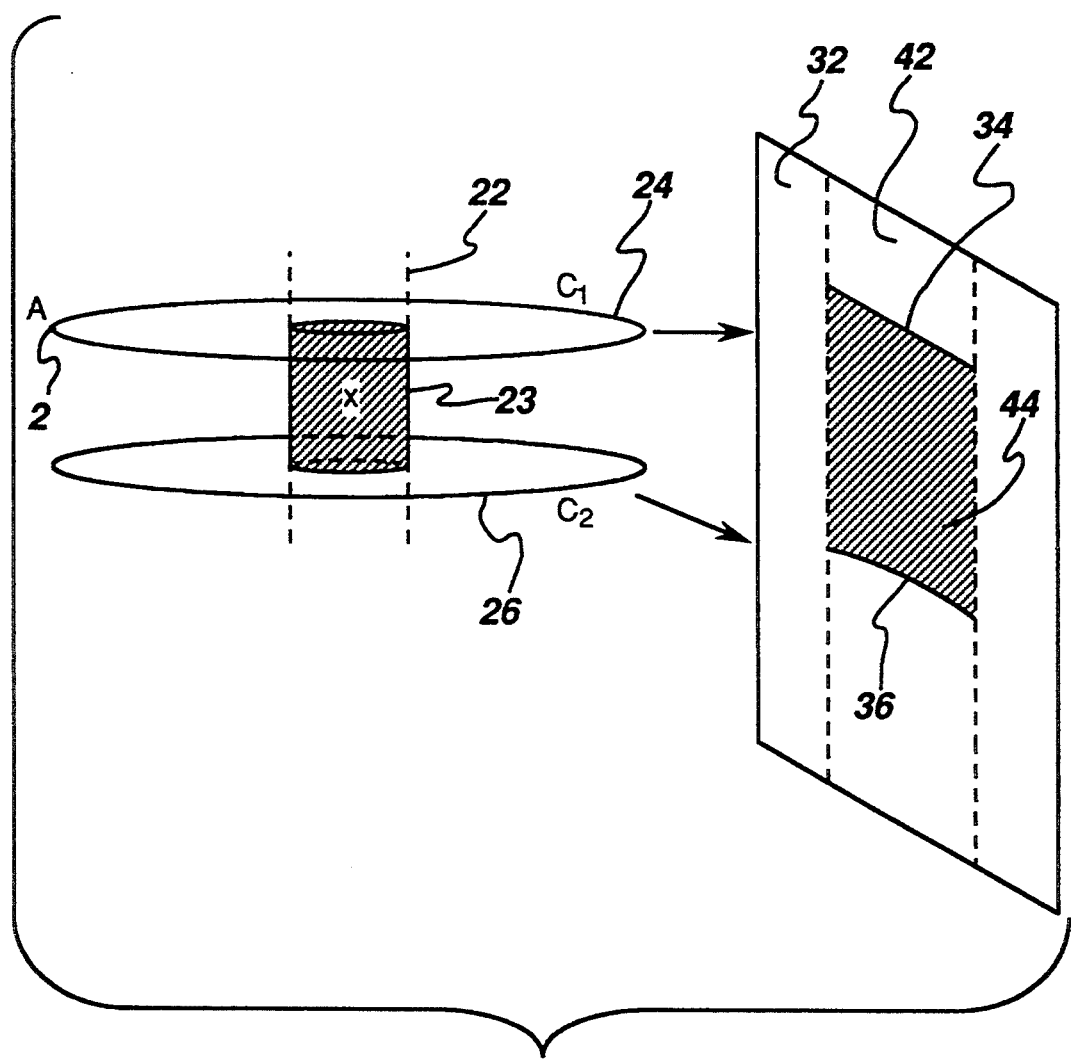
FIGS. 2a–2b illustrate in accordance with the invention identification of a select closed region at the surface of an array detector formed by the intersection of a cone beam projection of the object taken between respective cone beam projections of upper and lower scan paths, wherein only data acquired within this select region are retained for further image processing.

FIG. 2a illustrates object 22 wherein a particular region 23 is of interest to inspect. This region is labelled as region "X" and bounded by an upper enclosing scan path 24, labelled "$C_1$" and a lower enclosing scan path 26, labelled "$C_2$", having a connecting scan path therebetween (not shown). For the sake of illustration, upper and lower scan paths, 24 and 26, are herein illustrated as preferably circular enclosing a cylindrical region of interest 23. Consider any source position 2 along upper scan path $C_1$, a cone beam projection onto array detector surface 32 of upper and lower scan paths are identified by projection operator "P" operating on paths $C_1$ and $C_2$ respectively; wherein $P(C_1)$ projects thereon as straight line 34 and $P(C_2)$ projects thereon as parabolic curve 36.

Figure 2B:
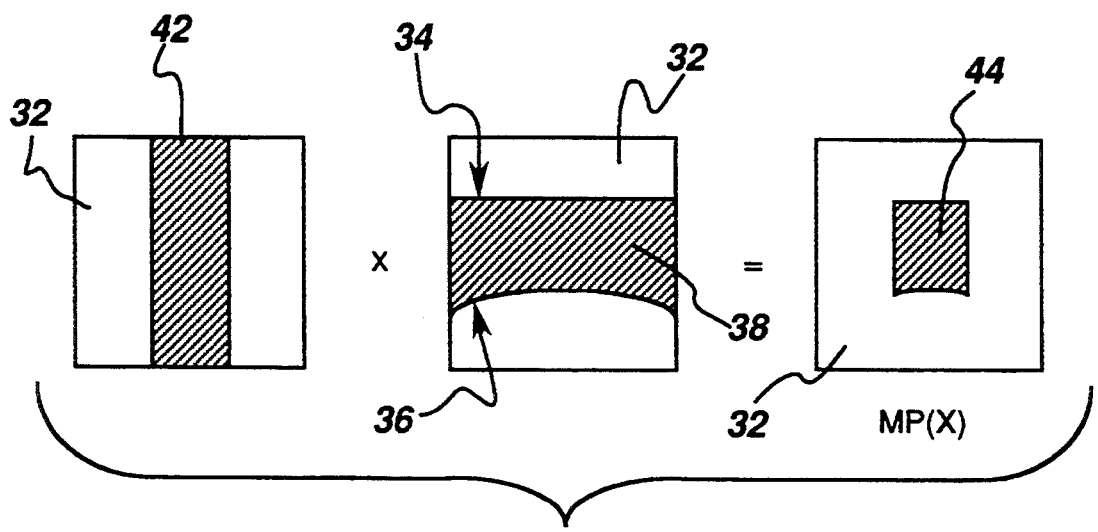

As illustrated in FIGS. 2a and 2b a select closed region 44 of detector surface 32 is identified by projection operators M and P operating on region X to provide region MP(X). Select closed region 44 is identified in accordance with the invention by taking the intersection of a cone beam projection 42 onto detector surface 32 of object 22 wherein this projection is bounded by $P(C_1)$ at 34 and $P(C_2)$ at 36. A select projection region 44 is identified by MP(X) on surface 32 of the array detector. Cone beam data is acquired at the detector array for each position along the rotational scanning trajectory, retaining only those cone beam attenuation data acquired within select region 44 for further processing. This manner of pre-processing data in accordance with the invention amounts to processing only data collected within region 44 which is herein referred to as the masked cone beam image MP (X). Beams detected at array detector surface 32 within mask region M 38 are due to beams emitted from source position A, at 2, within an angle defined by upper scan path $C_1$, at 34, and lower scan path $C_2$, at 36. Consequently some of these beams intersect region of interest 23 since these two scan paths enclose region of interest 23. Thus, all beam attenuation data within masked cone beam image MP(X) at 44 actually pass through region of interest 23 identified as region X without contamination by the rest of object 22 due to that portion of the object other than region X. Based upon this identified equivalence there is no longer a need to distinguish between different categories of integration planes using the partitioning as accorded in the background discussion. This otherwise requisite procedure is therefore eliminated in accordance with the invention resulting in a savings of time, money and computer resources.

Figure 3A:
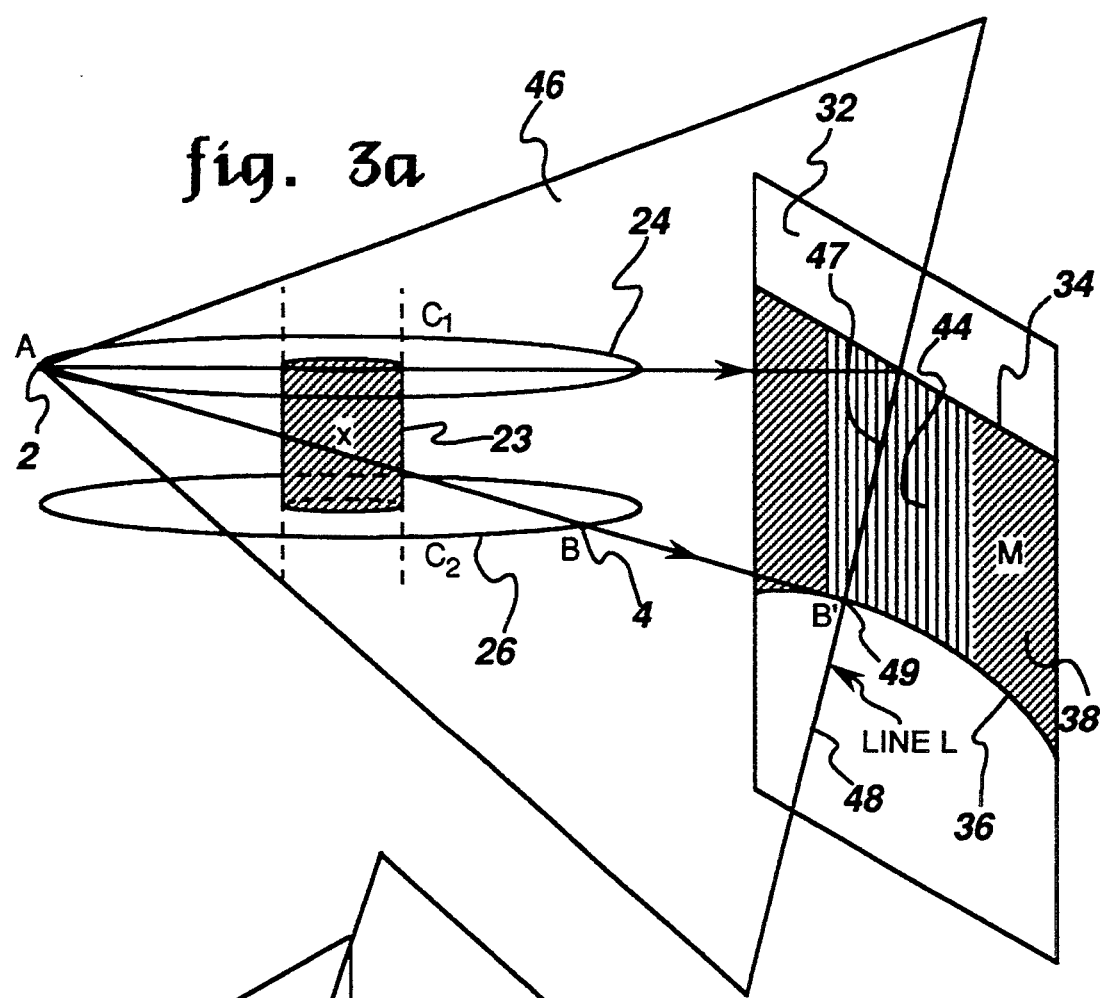
FIGS. 3a–3b illustrate a conventional requirement for matching Radon derivatives for partial plane contributions which is hereby shown to be unnecessary in accordance with the invention.

FIG. 3a illustrates that any plane 46 which intersects source position 2 and region of interest 23 also intersects detector array surface 32 in a line herein given by a line labelled "L" at 48 through masked cone beam image MP(X) at 44. That portion of line L identified by numeral 47 lying within mask region M, at 38, corresponds to beams emitted from source position A at 2 within an angle defined by upper scan path $C_1$ at 24 and lower scan path $C_2$ at 26 as previously illustrated in FIG. 2a. Referring back to FIG. 1, this angular range is precisely the same angular range of cone beam detector data used to compute a Radon derivative for upper partial plane 8 of FIG. 1. Consequently utilizing masked cone beam image MP(X) at 44 as input in the Radon derivative computation yields a Radon derivative for partial plane 8 without requiring any additional operations. The intersection point between line L, identified by numeral 48, and the lower edge of region M, identified by numeral 36, is labelled as "B'" and identified by numeral 49, wherein line AB' connects source position A at 2 to point B' while intersecting lower scan path $C_2$ at a point labelled B at 4.

Figure 3B:
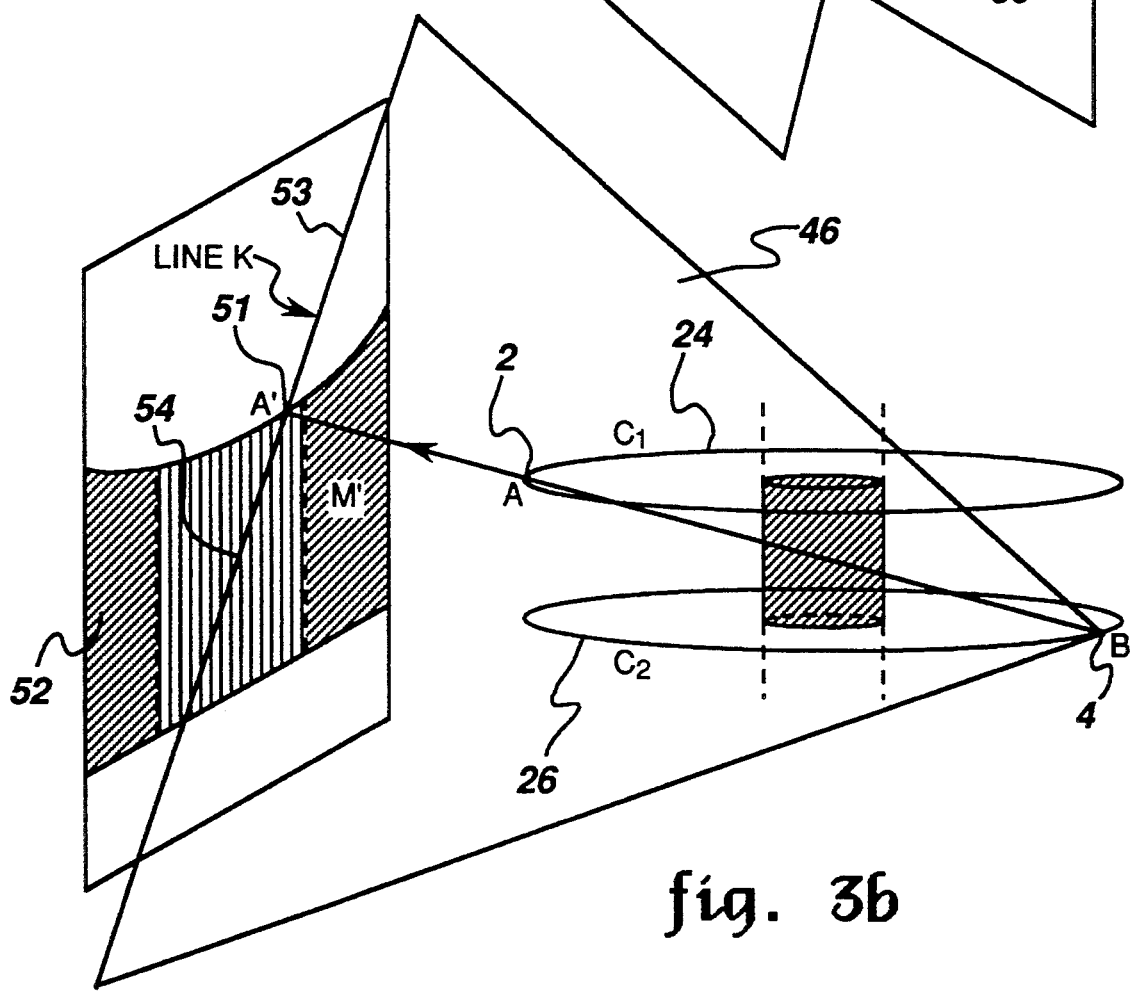

A similar situation exists as illustrated in FIG. 3b wherein the source is located at position B identified by numeral 4 along lower scan path $C_2$ at numeral 26 wherein corresponding masked detector region M' identified by numeral 52 is intersected by line K identified by numeral 53 at the upper edge of region M' identified by numeral 51 and labelled "A'", wherein line BA' connects source position B at 4 to point A' while intersecting upper scan path $C_1$ at point 2 labelled "A". It is essential to observe that it can be shown by geometry, that line BA' which connects source point B to point A' then intersects upper scan path $C_1$ identified by 24 at exactly the same source point A identified at 2 in both FIGS. 3a and 3b. Therefore, the portion of line K identified by 54 inside region M' defines partial plane 12 as referenced in FIG. 1. As a result of this identified equivalence, the Radon derivative computed using data on that portion of line K inside the masked detector region M' yields the value for partial plane 12.

In accordance with the invention, the Radon derivative for the entire portion of an integration plane intersecting the region of interest is obtained automatically by simply summing together values computed when the source is at positions A and B along upper and lower scan paths without regard to any prior partitioning by category of each type of integration plane. This eliminates partitioning of integration planes, according to U.S. patent application Ser. No. 07/725,142, as an otherwise necessary prerequisite to removing unwanted corrupting contributions from the Radon data set used to reconstruct a 3D image of the region of interest of an object. Thus, fewer computational operations are required in accordance with the invention providing a savings of time, money and computer resources.

Figure 4A:
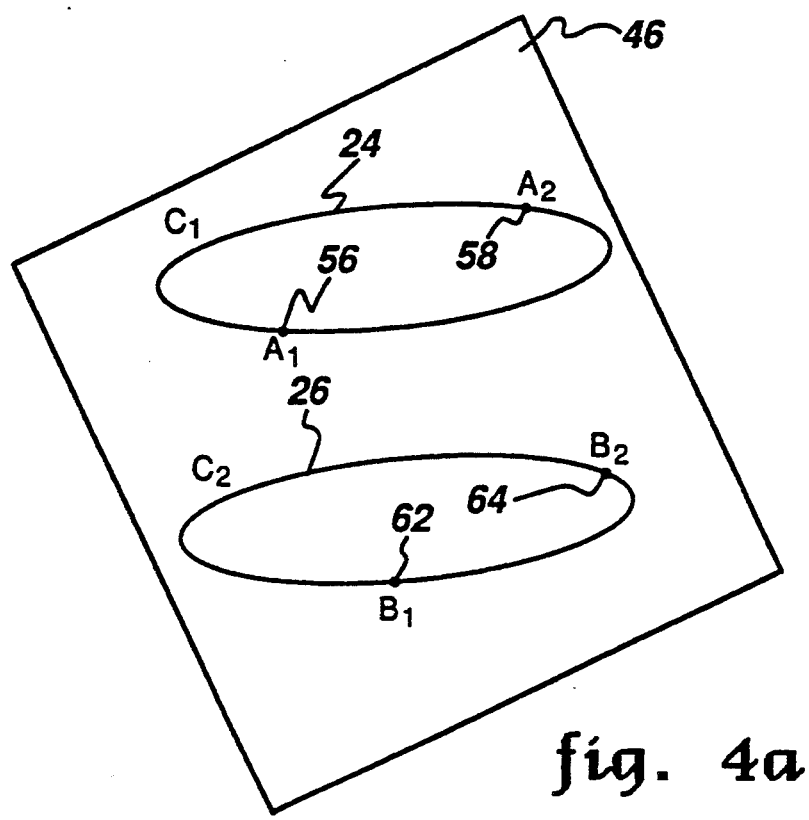
FIGS. 4a–4b illustrate a conventional requirement for keeping track of the exact number of source positions that contribute to a particular Radon point which is hereby shown to be unnecessary in accordance with the invention.
Figure 4B:
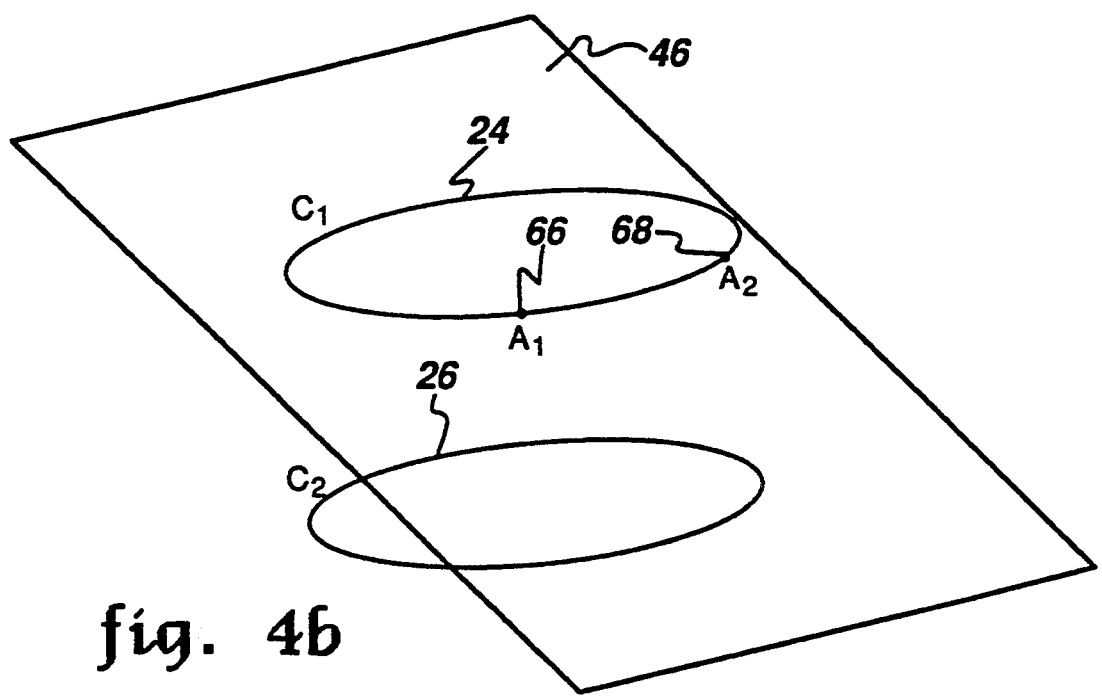

For any plane which intersects the region of interest and also the upper and lower scan paths, and whose Radon derivative is therefore computed from the upper and lower scan cone beam data, there are two possibilities: 1) the plane intersects both upper and lower scan paths, or 2) the plane intersects either upper or lower scan path but not both. FIG. 4a illustrates case 1) wherein plane 46 intersects upper scan path $C_1$ identified by 24 at two positions, $A_1$ at 56 and $A_2$, at 58 and lower scan path $C_2$ identified by 26 at two positions, $B_1$ at 62 and $B_2$ at 64. The sum of the result computed at position $A_1$, 56, and that computed at position $B_2$, 64, is equal to the Radon derivative for the portion of plane 46 intersecting the region of interest. Similarly the sum of the result computed at position $A_2$, 58, and that computed at position $B_1$, 62, is equal to the Radon derivative for that portion of plane 46 intersecting the region of interest. Therefore the sum of the results computed at all four source positions ($A_1$, $A_2$, $B_1$, and $B_2$) is equal to twice the desired result and must therefore be divided by a normalization factor of 2. FIG. 4b illustrates case 2) wherein plane 46 intersects upper scan path $C_1$, 24, at two positions, $A_1$, 66, and $A_2$, 68. Plane 46 does not intersect lower scan path $C_2$, 26; therefore, line L, identifying where plane 46 intersects detector array surface 32 does not intersect curve $P(C_2)$ and thus computation from that portion of line L within mask region M yields a Radon derivative for the entire portion of plane 46 intersecting the region of interest. This is true for source positions $A_1$, as well as, and $A_2$, 68; consequently, the total result from both source positions is equal to twice the desired result, requiring only division of the sum by a normalization factor of 2. Thus, for all cases wherein the Radon derivative is computed from source positions on upper and lower scan paths, the same normalization factor, i.e. 2, is involved. In accordance with the invention, for each Radon point the sum of all the results computed from source positions along upper and lower scan paths can be normalized by the same normalization factor, 2. Thus, yet another level of otherwise requisite tracking has been shown to be unnecessary in accordance with the invention further conserving time, money and computer resources.

Accordingly, it has been shown herein that otherwise requisite procedures including those identified above which consume computer resources and processing time have been effectively eliminated through pre-processing beam attenuation data at the earliest opportunity herein afforded at the array detector surface itself. Pre-processing herein consists of identifying a select region on the detector array surface as a cone beam surface projection of the object bounded between similarly projected upper and lower scan paths wherein only data acquired within that region is retained for further processing.

While specific embodiments of the invention have been illustrated and described herein, it is realized that numerous modifications and changes will occur to those skilled in the art. It is therefore understood that the appended claims are intended to cover all modifications and changes as fall within the true spirit and scope of the invention.

What is claimed is:

1. A method of pre-processing beam attenuation data for reconstructing a three dimensional (3D) image of a user selectable portion of an object using an inverse Radon transformation comprising the steps of:
   providing a mutually spaced irradiating beam source and a surface array radiation detector in fixed relationship to one another;
   providing said object therebetween;
   irradiating at least said portion of said object within a field of view of said source;
   rotationally scanning said portion with respect to said fixed source and detector along a trajectory enclosing upper and lower extents of said portion by respective upper and lower scan paths joined therebetween by a connecting scan path;
   identifying a select region on said array detector surface as a beam projection of said object bounded between similar said upper and lower scan path projections;
   acquiring beam attenuation data at said array detector surface for a plurality of source positions along said scan trajectory;
   retaining only beam attenuation data acquired within said select region; and
   processing only said retained data to reconstruct a 3D image of said object by said inverse Radon transformation.

2. Method according to claim 1 wherein said source is a cone beam source.

3. Method according to claim 1 wherein said detector surface is a planar surface.

4. Method according to claim 1 wherein a complete set of Radon data is acquired for reconstruction of an exact 3D image of said portion.

5. Apparatus for pre-processing cone beam attenuation data for exact three dimensional (3D) image reconstruction of a is user selectable portion of an object comprising:
   a radiation beam source;
   a surface array radiation detector means mutually spaced a fixed distance apart from said source;
   means for relatively rotating said object with respect to said fixed source and detector along a scanning trajectory to irradiate at least said portion of said object within a field of view of said source;
   means for identifying a select region of said detector surface corresponding to cone beam data passing through said portion;
   means for acquiring beam attenuation data at said detector surface for a plurality of source positions along said scanning trajectory;
   means for retaining only beam attenuation data acquired within said select region of said detector surface; and
   means for processing said retained data into a 3D image of said portion by a Radon inversion transformation.

6. Apparatus according to claim 5 wherein said beam source is a cone beam source.

7. Apparatus according to claim 5 wherein said surface array radiation detector is a planar array radiation detector.

8. Apparatus according to claim 5 wherein said means for rotating along said scanning trajectory further includes means for scanning along upper and lower scan paths respectively enclosing upper and lower extents of said portion of said object and a connecting scan path therebetween thereby allowing a complete set of Radon data to be acquired for reconstruction of an exact 3D image of said portion.

* * * * *